US010830056B2

(12) United States Patent
Erno et al.

(10) Patent No.: US 10,830,056 B2
(45) Date of Patent: Nov. 10, 2020

(54) FLUID COOLING SYSTEMS FOR A GAS TURBINE ENGINE

(71) Applicant: General Electric Company, Schenectady, NY (US)

(72) Inventors: Daniel Jason Erno, Clifton Park, NY (US); Narendra Digamber Joshi, Guilderland, NY (US); William Dwight Gerstler, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 528 days.

(21) Appl. No.: 15/424,021

(22) Filed: Feb. 3, 2017

(65) Prior Publication Data

US 2019/0003315 A1 Jan. 3, 2019

(51) Int. Cl.
*F01D 5/18* (2006.01)
*F02K 3/06* (2006.01)
(Continued)

(52) U.S. Cl.
CPC ............ *F01D 5/187* (2013.01); *F01D 9/065* (2013.01); *F01D 25/18* (2013.01); *F02C 7/14* (2013.01); *F02K 3/06* (2013.01); *F16N 39/02* (2013.01); *F01D 25/162* (2013.01); *F05D 2220/36* (2013.01); *F05D 2240/121* (2013.01); *F05D 2250/185* (2013.01); *F05D 2260/201* (2013.01); *F05D 2260/213* (2013.01); *F05D 2260/22141* (2013.01)

(58) Field of Classification Search
CPC .......... F01D 5/185; F01D 5/187; F01D 9/065; F01D 25/18; F01D 25/162; F02C 7/14; F02K 3/06; F16N 39/02; F05D 2220/32; F05D 2220/36; F05D 2240/121; F05D 2250/185; F05D 2260/201; F05D 2260/213; F05D 2260/22141
USPC .................. 416/97 R; 415/115, 116, 114
See application file for complete search history.

(56) References Cited

U.S. PATENT DOCUMENTS 2,050,327 A    8/1936   Howard
2,252,528 A    8/1941   Sikorsky et al.
(Continued)

FOREIGN PATENT DOCUMENTS

WO    2015183360 A2    12/2015

OTHER PUBLICATIONS

Gray et al., "Improvements in Heat Transfer for Anti-Icing of Gas-Heated Airfoils with Internal Fins and Partitions", NASA Technical Reports Server (NTRS), pp. 45, Jul. 1, 1950.
(Continued)

*Primary Examiner* — Brian P Wolcott
(74) *Attorney, Agent, or Firm* — Armstrong Teasdale LLP

(57) ABSTRACT

A heat exchanger includes an airfoil configured to be positioned in a coolant stream. The airfoil includes a pressure sidewall and a suction sidewall coupled to the pressure sidewall. The suction sidewall and the pressure sidewall define a leading edge and a trailing edge opposite the leading edge. The leading edge defines an impingement zone wherein the coolant stream is configured to impinge the airfoil. The heat exchanger also includes at least one channel defined within the airfoil between the pressure sidewall and the suction sidewall. The at least one channel is at least partially defined within the impingement zone proximate the leading edge.

19 Claims, 7 Drawing Sheets

(51) Int. Cl.
*F01D 9/06* (2006.01)
*F01D 25/18* (2006.01)
*F02C 7/14* (2006.01)
*F16N 39/02* (2006.01)
*F01D 25/16* (2006.01)

(56) References Cited

U.S. PATENT DOCUMENTS

| | | | |
|---|---|---|---|
| 3,835,921 A | | 9/1974 | Faris et al. |
| 3,844,679 A | * | 10/1974 | Grondahl ............... F01D 5/185 416/97 R |
| 4,136,516 A | * | 1/1979 | Corsmeier ............. F01D 5/185 415/114 |
| 4,645,415 A | * | 2/1987 | Hovan .................. F01D 25/125 415/115 |
| 4,684,322 A | * | 8/1987 | Clifford ................. F01D 5/187 415/175 |
| 4,914,904 A | * | 4/1990 | Parnes ................... F01D 9/065 165/168 |
| 5,729,969 A | * | 3/1998 | Porte ....................... F02C 6/08 60/226.1 |
| 5,897,076 A | | 4/1999 | Tracy |
| 6,200,087 B1 | * | 3/2001 | Tung ...................... F01D 5/186 415/115 |
| 6,905,301 B2 | * | 6/2005 | Tiemann ................ F01D 5/189 415/115 |
| 7,520,465 B2 | | 4/2009 | Mahjoub |
| 7,645,122 B1 | | 1/2010 | Liang |
| 8,500,405 B1 | * | 8/2013 | Jones ..................... F01D 9/065 415/115 |
| 8,616,834 B2 | | 12/2013 | Knight, III et al. |
| 9,255,745 B2 | | 2/2016 | Bertolotti et al. |
| 9,388,739 B2 | * | 7/2016 | Marini .................... F02C 6/08 |
| 9,726,029 B2 | * | 8/2017 | Ribarov ................. F01D 9/065 |
| 9,945,325 B2 | * | 4/2018 | Roberge ................. F02K 3/105 |
| 10,233,841 B2 | * | 3/2019 | Bintz ...................... F02C 7/16 |
| 2006/0042223 A1 | * | 3/2006 | Walker ................... F01D 9/065 60/39.08 |
| 2012/0243970 A1 | * | 9/2012 | Hellgren ................ F01D 5/187 415/1 |
| 2015/0198050 A1 | * | 7/2015 | Lee ........................ F01D 5/188 415/115 |

OTHER PUBLICATIONS

Silverstein, "A feasibility study of heat-pipe-cooled leading edges for hypersonic cruise aircraft", NASA Technical Reports Server (NTRS), pp. 77, Nov. 1, 1971 (Part 1, pp. 1-67).
Silverstein, "A feasibility study of heat-pipe-cooled leading edges for hypersonic cruise aircraft", NASA Technical Reports Server (NTRS), pp. 74, Nov. 1, 1971 (Part 2, pp. 68-141).

* cited by examiner

FLUID COOLING SYSTEMS FOR A GAS TURBINE ENGINE

BACKGROUND

The field of the disclosure relates generally to gas turbine engines and, more specifically, to fluid cooling systems for a gas turbine engine.

Gas turbine engines, for example turbofans, typically include a circulating oil system for lubricating and cooling engine components such as bearings, gearboxes, and electrical generators. In operation, the engine oil absorbs heat from the engine components that will then be removed from the oil before recirculating. As gas turbine engines become larger, faster, and more powerful and efficient, more heat within the engine oil will need to be removed.

At least some known oil systems include one or more heat exchangers that facilitate removing heat from the engine oil. For example, air-to-oil heat exchangers, such as air cooled oil coolers (ACOCs), are used to remove heat from the engine oil. The ACOCs may be placed on a surface of a bypass duct of the turbofan and use bypass air flow as a coolant flow to remove heat from the engine oil flow therein. However, the ACOCs also create aerodynamic drag in the fan air flow, thereby reducing thrust of the turbofan. In another example, fuel-to-oil heat exchangers are additionally or alternatively used to remove heat from the engine oil. The fuel-to-oil heat exchangers use fuel flow as a coolant flow to remove heat from the engine oil flow therein. However, when fuel is subjected to high temperatures, hydrocarbon reactions are accelerated resulting in new organic compounds, also known as gum or varnish, which forms and can aggregate within fuel system components. Additionally, fuel flow in turbofans decreases as the turbofan fuel efficiency increases.

BRIEF DESCRIPTION

In one aspect, a heat exchanger is provided. The heat exchanger includes an airfoil configured to be positioned in a coolant stream. The airfoil includes a pressure sidewall and a suction sidewall coupled to the pressure sidewall. The suction sidewall and the pressure sidewall define a leading edge and a trailing edge opposite the leading edge. The leading edge defines an impingement zone wherein the coolant stream is configured to impinge the airfoil. The heat exchanger also includes at least one channel defined within the airfoil between the pressure sidewall and the suction sidewall. The at least one channel is at least partially defined within the impingement zone proximate the leading edge.

In another aspect, an outlet guide vane is provided. The outlet guide vane includes an airfoil including a pressure sidewall, and a suction sidewall coupled to the pressure sidewall. The suction sidewall and the pressure sidewall define a leading edge and a trailing edge opposite the leading edge. The leading edge defines an impingement zone wherein the coolant stream is configured to impinge the airfoil. The outlet guide vane further includes a heat exchanger including at least one channel defined within the airfoil between the pressure sidewall and the suction sidewall. The at least one channel is at least partially defined within the impingement zone proximate the leading edge.

In still another aspect, a turbofan engine is provided. The turbofan engine includes a core engine, a bypass duct at least partially extending about the core engine, and a plurality of circumferentially spaced outlet guide vanes extending between the core engine and the bypass duct. At least one outlet guide vane of the plurality of outlet guide vanes includes an airfoil including a pressure sidewall, and a suction sidewall coupled to the pressure sidewall. The suction sidewall and the pressure sidewall define a leading edge and a trailing edge opposite the leading edge. The leading edge defines an impingement zone wherein the coolant stream is configured to impinge the airfoil. The outlet guide vane further includes a heat exchanger including at least one channel defined within the airfoil between the pressure sidewall and the suction sidewall. The at least one channel is at least partially defined within the impingement zone proximate the leading edge.

DRAWINGS

These and other features, aspects, and advantages of the present disclosure will become better understood when the following detailed description is read with reference to the accompanying drawings in which like characters represent like parts throughout the drawings, wherein.

Figure 1:
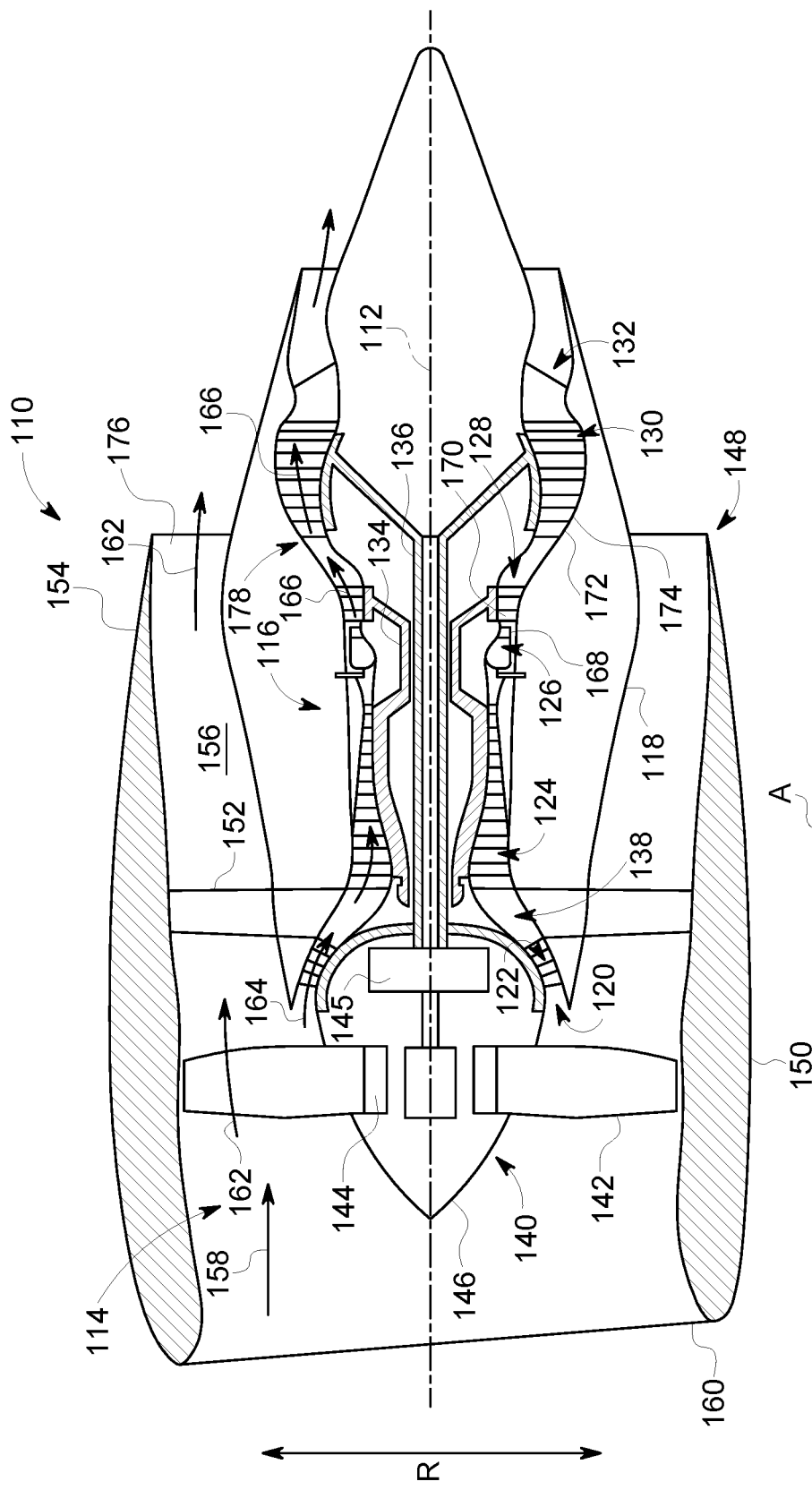
FIG. 1 is a schematic view of an exemplary turbofan engine, i.e., a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged.

Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about a longitudinal axis of the gas turbine engine.

Embodiments of the present disclosure relate to heat exchangers within an airfoil that provide a more effective cooling system for engine oil, from a turbofan engine, channeled therethrough. Specifically, in the exemplary embodiments, a heat exchanger includes an outlet guide vane airfoil. The airfoil includes a pressure sidewall and a suction sidewall, which define a leading edge and a trailing edge. The leading edge defines an impingement zone of the airfoil in which a coolant stream impinges the airfoil. At least one cooling channel is defined within the airfoil and within the impingement zone proximate the leading edge. As such, when a fluid, for example, engine oil, is channeled through the cooling channels, the fluid is channeled through zones of the airfoil in which the coolant stream is at its most effective and with an increased heat transfer coefficient. By increasing efficiency of the airfoil heat exchanger, the amount of heat extracted from engine oil increases, thereby reducing use of aerodynamic drag inducing heat exchangers and facilitating a more efficient turbofan engine.

FIG. 1 is a schematic view of a gas turbine engine 110, e.g., a turbomachine, in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal axis 112 provided for reference) and a radial direction R. In general, turbofan engine 110 includes a fan assembly 114 and a core turbine engine 116 disposed downstream from fan assembly 114.

In the exemplary embodiment, core turbine engine 116 includes a substantially tubular engine casing 118 that defines an annular inlet 120. Engine casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, turbine section, and nozzle section 132 together define a core air flowpath 138.

Fan assembly 114 includes a fan 140 having a plurality of fan blades 142 coupled to a disk 144 in a spaced apart manner. As depicted, fan blades 142 extend outwardly from disk 144 generally along radial direction R. Fan blades 142 and disk 144 are together rotatable about longitudinal axis 112 by LP shaft 136 across a power gear box 145. Power gear box 145 includes a plurality of gears for adjusting the rotational speed of fan 140 relative to LP shaft 136 to a more efficient rotational fan speed. In the exemplary embodiment, turbofan engine 110 is a "geared turbofan engine" including power gearbox 145. Alternatively, turbofan engine 110 may be a direct drive engine that does not utilize a gearbox such as, power gear box 145.

Disk 144 is covered by rotatable front hub 146 aerodynamically contoured to promote an airflow through plurality of fan blades 142. Additionally, fan assembly 114 and at least a portion of core turbine engine 116 are surrounded by a nacelle assembly 148, which includes an annular fan casing or outer nacelle 150 that circumferentially surrounds fan 140 and/or at least a portion of core turbine engine 116. In the exemplary embodiment, nacelle 150 is configured to be supported relative to core turbine engine 116 by a plurality of circumferentially-spaced outlet guide vanes 152. Moreover, a downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan assembly 114. As volume of air 158 passes across fan blades 142, a first portion, a fan stream 162 of air 158 is directed or routed into bypass airflow passage 156 and a second portion 164 of air 158 is directed or routed into core air flowpath 138, or more specifically into LP compressor 122. A ratio between first portion 162 and second portion 164 is commonly known as a bypass ratio. The pressure of second portion 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to engine casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to engine casing 118 and LP turbine rotor blades 174 that are coupled to LP shaft or spool 136, thus causing LP shaft or spool 136 to rotate which causes power gear box 145 to rotate LP compressor 122 and/or rotation of fan 140.

Combustion gases 166 are subsequently routed through jet exhaust nozzle section 132 of core turbine engine 116 to provide propulsive thrust. Simultaneously, the pressure of first portion 162 is substantially increased as first portion 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration, including, for example, a turboprop engine.

Figure 2:
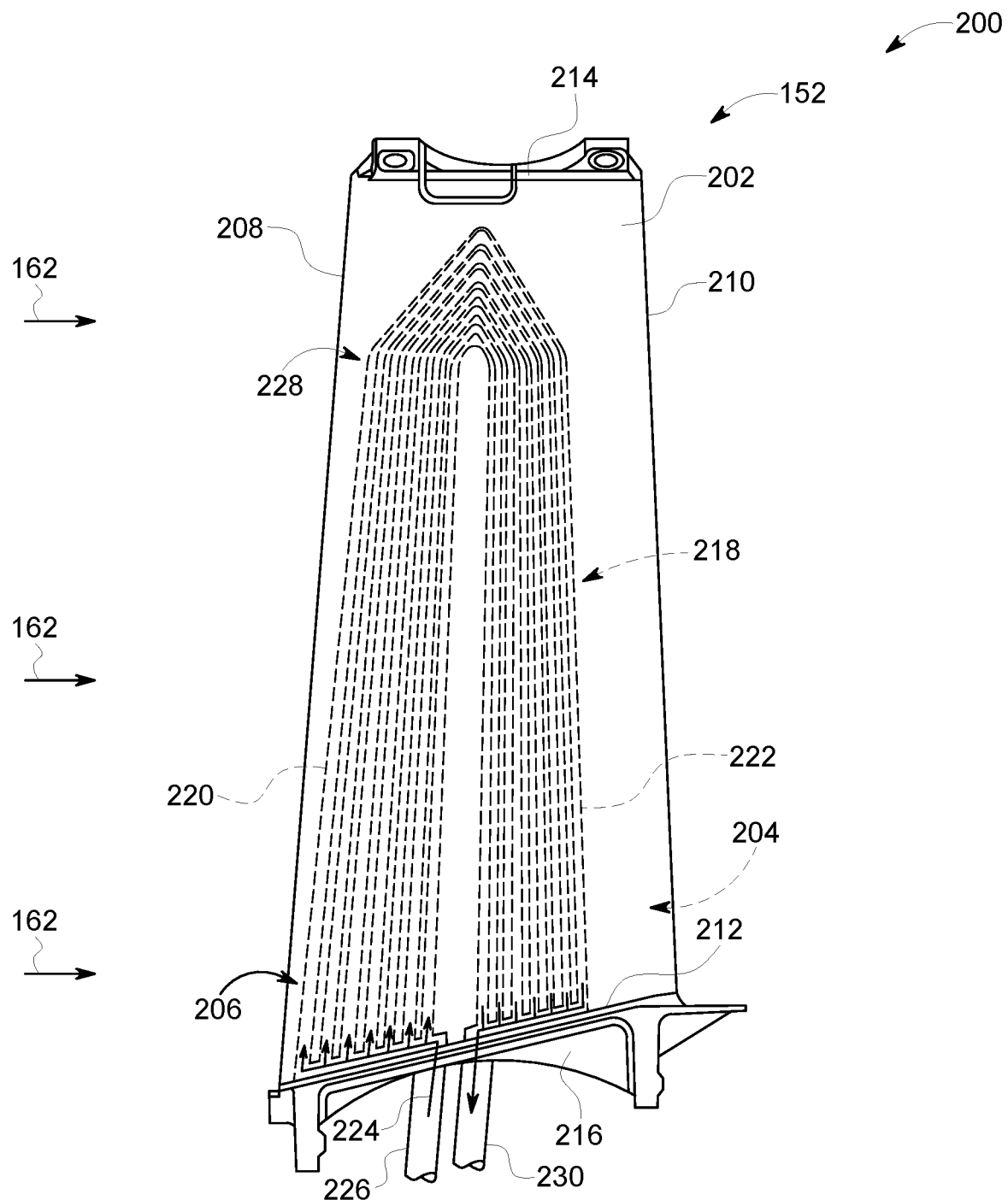
FIG. 2 is a perspective view of an exemplary heat exchanger that may be used with the turbofan engine shown in FIG. 1.

FIG. 2 is a perspective view of an exemplary heat exchanger 200 that may be used with turbofan engine 110 (shown in FIG. 1). In the exemplary embodiment, heat exchanger 200 is an air cooled oil cooler (ACOC) and is defined within outlet guide vane (OGV) 152. Alternatively, heat exchanger 200 is any other heat exchanger, including, without limitation, an air-to-air heat exchanger, or any other fluid-to-air heat exchanger utilizing a suitable fluid, such as, fuel, glycol, or a synthetic heat transfer liquid configured to interact between a heat source and the fan duct air. OGV 152 includes an airfoil 202 that includes a convex suction sidewall 204 coupled to a concave pressure sidewall 206. Suction sidewall 204 and pressure sidewall 206 define a leading edge 208 and a trailing edge 210 opposite leading edge 208. Suction sidewall 204 and pressure sidewall 206 further define a root portion 212 and a tip portion 214 opposite root portion 212. An arcuate inner platform 216 is disposed at root portion 212.

In the exemplary embodiment, heat exchanger 200 includes at least one cooling channel 218 defined within airfoil 202 between pressure sidewall 206 and suction sidewall 204 and proximate leading edge 208. FIG. 2 illustrates a plurality of cooling channels 218 in a parallel arrangement and defined within airfoil 202, in alternative embodiments, any number of cooling channels 218 are defined therein that enables heat exchanger 200 to operate as described herein. Cooling channels 218 are substantially U-shaped and each cooling channel 218 includes at least one inlet section 220 that extends from root portion 212 towards tip portion 214 proximate leading edge 208 and at least one outlet section 222 that extends from tip portion 214 to root portion 212 adjacent trailing edge 210. Additionally, cooling channels 218 are defined adjacent to pressure sidewall 206.

Moreover, cooling channels 218 are sized to facilitate maintaining a flow velocity of fluid that is channeled therethrough for consistent heat transfer, while also maintaining a predetermined wall thickness of airfoil 202. For example, each channel 218 has a constant cross-sectional profile along the length of each channel 218. In alternative embodiments, each channel 218 has a varying cross-sectional profile along the length of each channel 218 to correspond to the varying shape of airfoil 202. In another example, each channel 218 has a similar cross-sectional profile to the adjacent channels 218. In alternative embodiments, each channel 218 has a different cross-sectional profile to the adjacent channels 218 to correspond to the varying shape of airfoil 202. In general, those of ordinary skill in the art are capable of designing the cross-sectional profile of channel 218 to obtain the desired balance of flow distribution, pressure drop, and heat transfer.

In operation, engine oil 224, for example, oil from power gear box 145 (shown in FIG. 1), is channeled to heat exchanger 200 and through cooling channels 218 by an inlet line 226 of an engine oil system for heat to be extracted therefrom. Outlet guide vane 152 is positioned in bypass passage 156 (shown in FIG. 1) such that fan air stream 162 is channeled past airfoil 202 and acts as a coolant fluid in heat exchanger 200. Specifically, fan air stream 162 impinges airfoil 202 at an impingement zone 228. Impingement zone 228 is an external impingement zone configured such that an external fluid, such as fan air stream 162 impinges airfoil 202 at impingement zone 228. Impingement zone 228 is defined at leading edge 208 between root portion 212 and tip portion 214 and includes adjacent portions of pressure sidewall 206 and suction sidewall 204 wherein fan air stream 162 strikes against airfoil 202. After impinging airfoil 202, fan air stream 162 then flows along both pressure sidewall 206 and suction sidewall 204 towards trailing edge 210.

At impingement zone 228, a heat transfer coefficient of fan air stream 162 increases because of the stream impinging on airfoil 202. As such, cooling channels 218 are defined proximate to leading edge 208 and within impingement zone 228 to transfer heat from engine oil 224 to fan air stream 162. For example, inlet sections 220 are defined proximate to leading edge 208 such that heat transfer between engine oil 224 and fan air stream 162 is increased.

Furthermore, as engine oil 224 is channeled through cooling channels 218 that are outside of impingement zone 228, heat is further removed by convection and conduction cooling through fan air stream 162 channeling along pressure sidewall 206 and suction sidewall 204. For example, outlet sections 222 are adjacent pressure sidewall 206. In alternative embodiments, outlet sections 222 are adjacent suction sidewall 204. Although, the heat transfer coefficient of fan air stream 162 is reduced outside of impingement zone 228, heat from engine oil 224 is still transferred to fan air stream 162. The cooled engine oil 224 is then channeled back to the engine oil system through outlet line 230. Additionally, by positioning cooling channels 218 away from trailing edge 210, fan air stream 162 does not have the chance to develop a boundary layer flow adjacent to pressure sidewall 206 and/or suction sidewall 204 which would further reduce the heat transfer coefficient of fan air stream 162. Further, cooling channels 218 are positioned adjacent to pressure sidewall 206 because the boundary layer flow, if any, develops closer towards trailing edge 210 than on suction sidewall 204.

Figure 3:
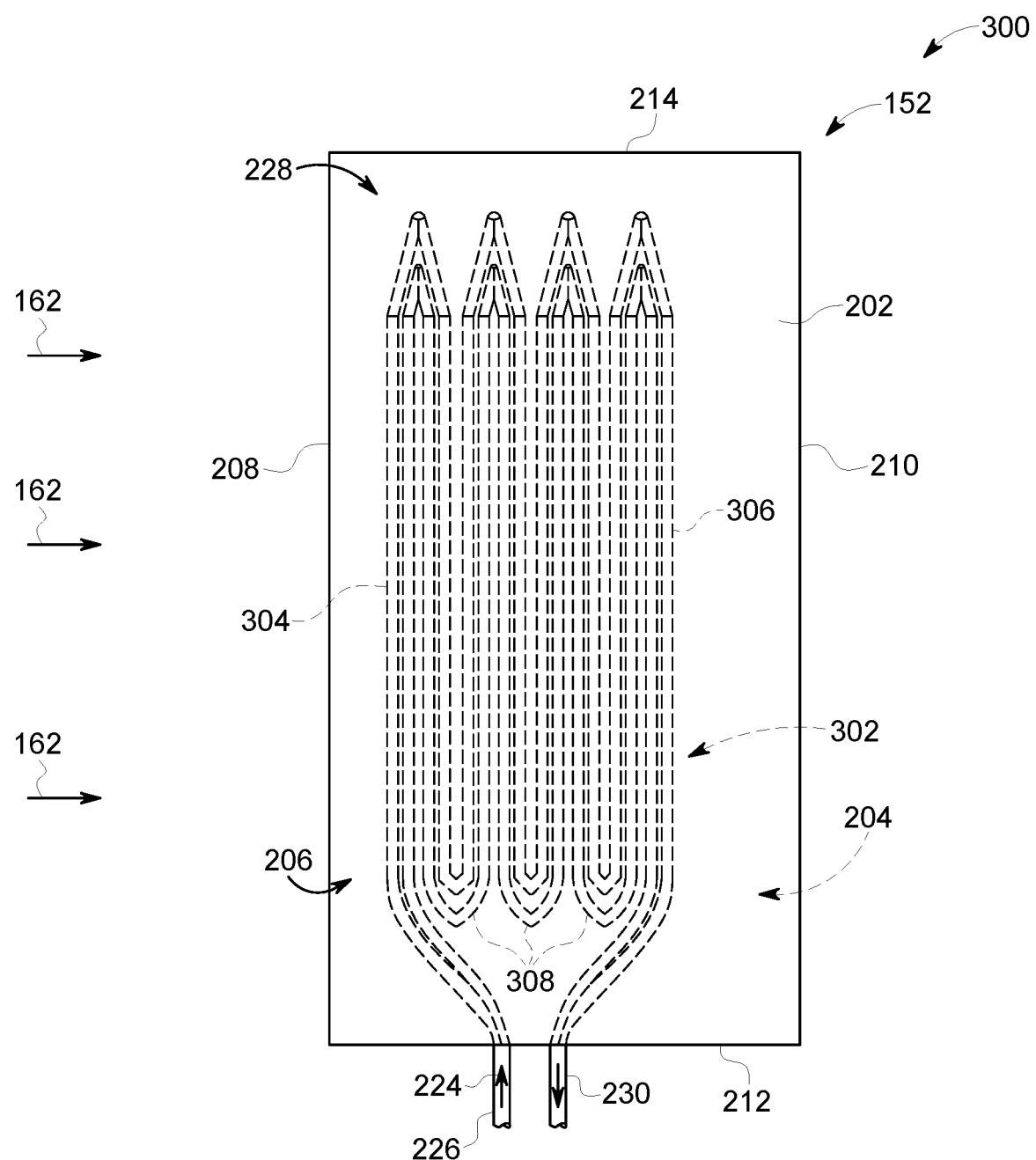
FIG. 3 is a side view of an alternative heat exchanger that may be used with the turbofan engine shown in FIG. 1.

FIG. 3 is a side view of an alternative heat exchanger 300 that may be used with turbofan engine 110 (shown in FIG. 1). In this embodiment, heat exchanger 300 is defined within outlet guide vane (OGV) 152. Similar to the embodiment described above, OGV 152 includes an airfoil 202 that includes suction sidewall 204, pressure sidewall 206, leading edge 208, trailing edge 210, root portion 212, and tip portion 214.

In this embodiment, heat exchanger 300 includes at least one cooling channel 302 defined within airfoil 202 between pressure sidewall 206 and suction sidewall 204 and proximate leading edge 208. FIG. 3 illustrates two cooling channels 302 in a parallel arrangement and defined within airfoil 202, in alternative embodiments, any other number of cooling channels 302 are defined therein that enables heat exchanger 300 to operate as described herein. Cooling channels 302 are substantially serpentine S-shaped and each cooling channel 302 includes at least one inlet section 304 that extends from root portion 212 towards tip portion 214 proximate leading edge 208 and at least one outlet section 306 that extends from tip portion 214 to root portion 212 adjacent trailing edge 210. Between inlet section 304 and outlet section 306 cooling channels 302 include at least one middle section 308 that extends from inlet section 304 at tip portion 214 towards root portion 212 and from root portion 212 back towards outlet section 306 at tip portion 214. FIG. 3 illustrates three middle sections 308 defined within airfoil 202, however, in alternate embodiments, any other number of middle sections 308 are defined therein that enables heat exchanger 300 to operate as described herein. Additionally, cooling channels 302 are defined adjacent to pressure sidewall 206. In alternative embodiments, cooling channels 302 are defined adjacent to suction sidewall 204.

Similar to the embodiment described above, cooling channels 302 are sized to facilitate maintaining a flow velocity of fluid that is channeled therethrough for consistent heat transfer, while also maintaining a predetermined wall thickness of airfoil 202. For example, each channel 302 has a constant cross-sectional profile along the length of each channel 302. In alternative embodiments, each channel 302 has a varying cross-sectional profile along the length of each channel 302 to correspond to the varying shape of airfoil 202. In another example, each channel 302 has a similar cross-sectional profile to an adjacent channel 302. In alternative embodiments, each channel 302 has a different cross-sectional profile to the adjacent channel 302 to correspond to the varying shape of airfoil 202. In general, those of ordinary skill in the art can design the cross-sectional profile of channel 302 to obtain the desired balance of flow distribution, pressure drop, and heat transfer.

In operation, engine oil 224 is channeled to heat exchanger 300 and through cooling channels 302 by inlet line 226 for heat to be extracted therefrom. Specifically, fan air stream 162 impinges airfoil 202 at impingement zone 228. At impingement zone 228, heat is transferred from engine oil 224 channeled through cooling channels 302. Furthermore, as engine oil 224 is channeled through cooling channels 302 that are outside of impingement zone 228, heat is further removed by convection and conduction cooling through fan air stream 162 along pressure sidewall 206. The cooled engine oil 224 is then channeled back to the engine oil system through outlet line 230.

Figure 4:
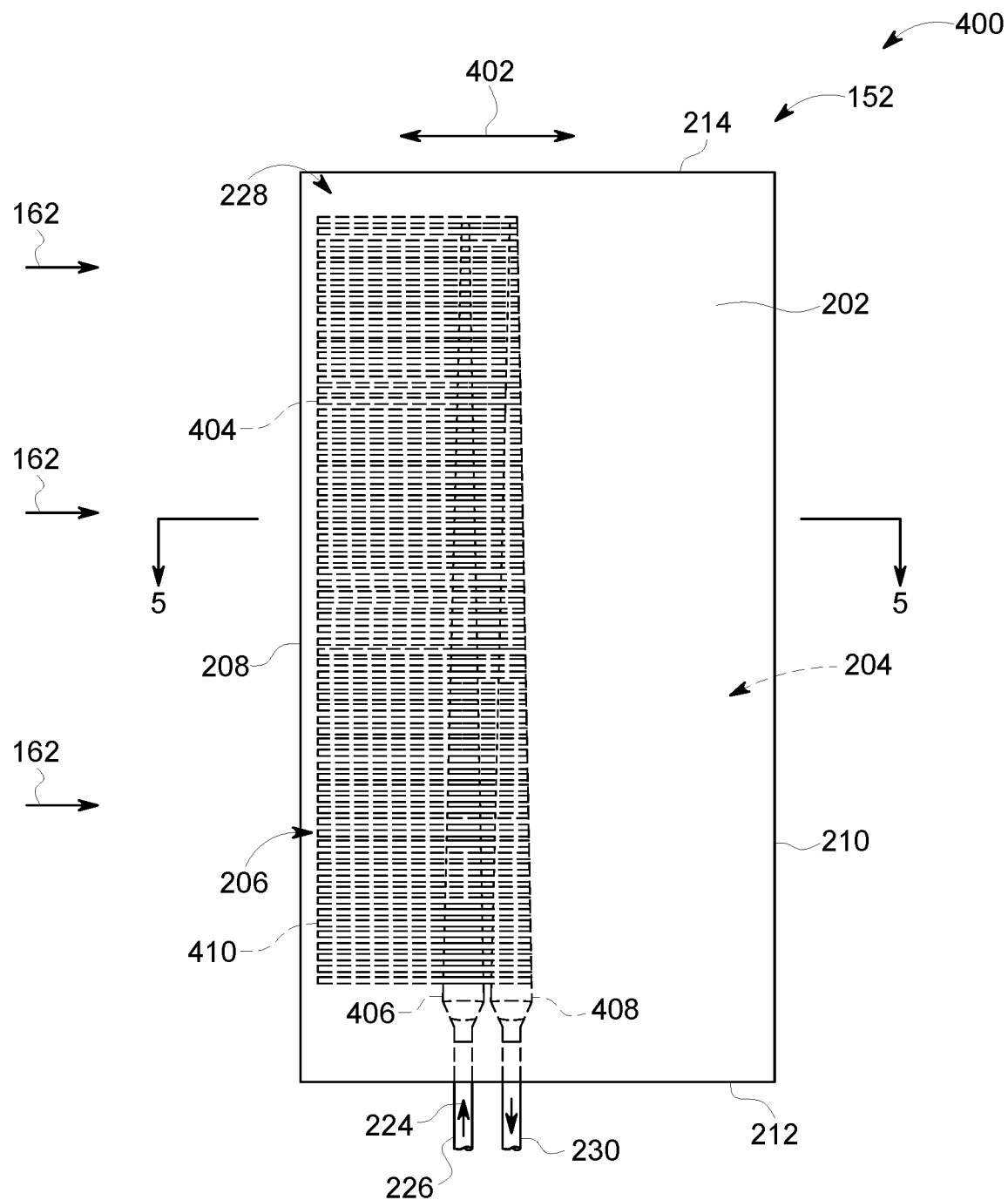
FIG. 4 is a side view of another alternative heat exchanger that may be used with the turbofan engine shown in FIG. 1.
Figure 5:
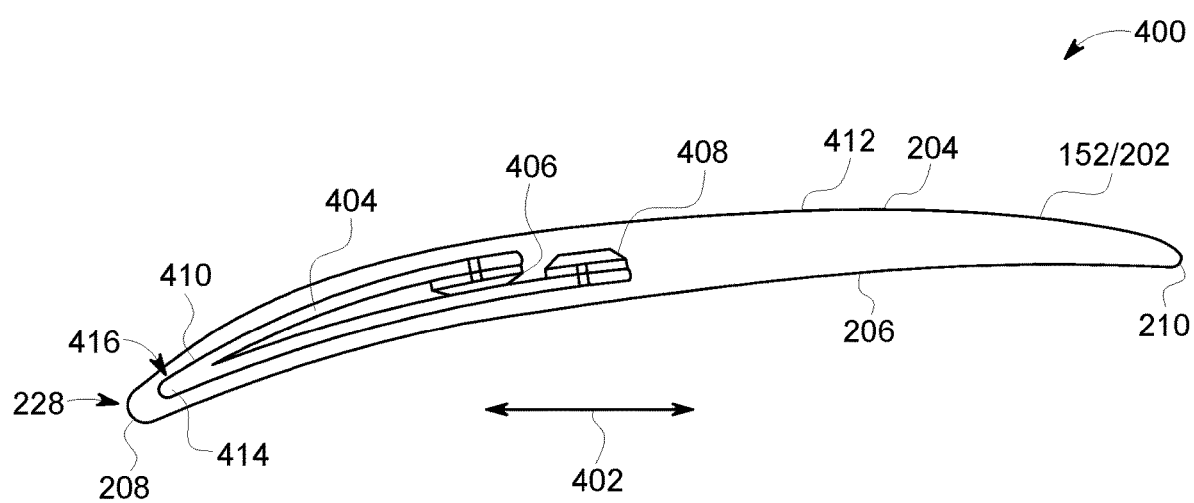
FIG. 5 is a cross-sectional view taken along 5-5 of the heat exchanger shown in FIG. 4.

FIG. 4 is a side view of another alternative heat exchanger 400 that may be used with turbofan engine 110 (shown in FIG. 1). FIG. 5 is a cross-sectional view taken along 5-5 of heat exchanger 400 shown in FIG. 4. Referring to FIGS. 4 and 5, in this embodiment, heat exchanger 400 is defined within outlet guide vane (OGV) 152. Similar to the embodiments described above, OGV 152 includes an airfoil 202 that includes suction sidewall 204, pressure sidewall 206, leading edge 208, trailing edge 210, root portion 212, and tip portion 214. Airfoil 202 further defines a chord direction 402.

In this embodiment, heat exchanger 400 includes at least one cooling channel 404 defined within airfoil 202 between pressure sidewall 206 and suction sidewall 204 and proximate leading edge 208. For example, cooling channels 404 include an inlet section 406 that extends from root portion 212 towards tip portion 214 adjacent suction sidewall 204 and an outlet section 408 that extends from tip portion 214 to root portion 212 adjacent pressure sidewall 206. Inlet section 406 is positioned within airfoil 202 adjacent suction sidewall 204 and outlet section 408 is positioned within airfoil 202 adjacent pressure sidewall 206.

Between inlet section 406 and outlet section 408, cooling channels 404 include at least one middle section 410 that extends substantially parallel to and along chord direction 402 from inlet section 406 towards leading edge 208 adjacent suction sidewall 204 and from leading edge 208 to outlet section 408 adjacent pressure sidewall 204 such that middle sections 410 correspond to a perimeter 412 of airfoil 202. As such, middle sections 410 are substantially parallel to root and tip portions 212 and 214 of airfoil 202 while also being substantially orthogonal to leading edge 208. Cooling channels 404 further include a surface 414, and an impingement zone 416. Impingement zone 416 is an internal impingement zone configured such that, an internal fluid such as engine oil 224 will impinge airfoil 202 at impingement zone 416. Additionally, middle section 410 is disposed at least partially within impingement zone 416. FIG. 4 illustrates a plurality of middle sections 410 defined within airfoil 202. However, in alternative embodiments, any other number of middle sections 410 are defined therein that enables heat exchanger 400 to operate as described herein.

Similar to the embodiments described above, cooling channels 404 are sized to facilitate maintaining a flow velocity of fluid that is channeled therethrough for consistent heat transfer, while also maintaining a predetermined wall thickness of airfoil 202. For example, inlet and outlet sections 406 and 408 each have a conical shape that extend from root portion 212 towards tip portion 214 with each middle section 410 having a similar cross-section area extending therebetween. As such, the flow velocity of fluid therethrough is constant throughout each middle section 410. In alternative embodiments, inlet and outlet sections 406 and 408 may have other shapes that taper as they extend from root portion 212 towards tip portion 214, with each middle section 410 having a similar cross section area extending therebetween. A taper is defined as a narrowing of a shape towards one end.

In operation, engine oil 224 is channeled to heat exchanger 400 and through cooling channels 404 by inlet line 226 for heat to be extracted therefrom. Specifically, an external fluid, such as fan air stream 162 impinges airfoil 202 at impingement zone 228. Impingement zone 228 is an external impingement zone configured such that an external fluid impinges airfoil 202 at impingement zone 228. At impingement zone 228, heat is transferred from engine oil 224 channeled through cooling channels 404. At impingement zone 416, heat is transferred from engine oil 224 channeled through cooling channels 404. Furthermore, as engine oil 224 is channeled through cooling channels 404 that are outside of impingement zone 228, heat is further removed by convection and conduction cooling through fan stream air 162 along pressure sidewall 206 and suction sidewall 204. Additionally, in operation, surface 414 provides an interface between cooling channels 404 and leading edge 208. The cooled engine oil 224 is then channeled back to the engine oil system through outlet line 230.

Figure 6:
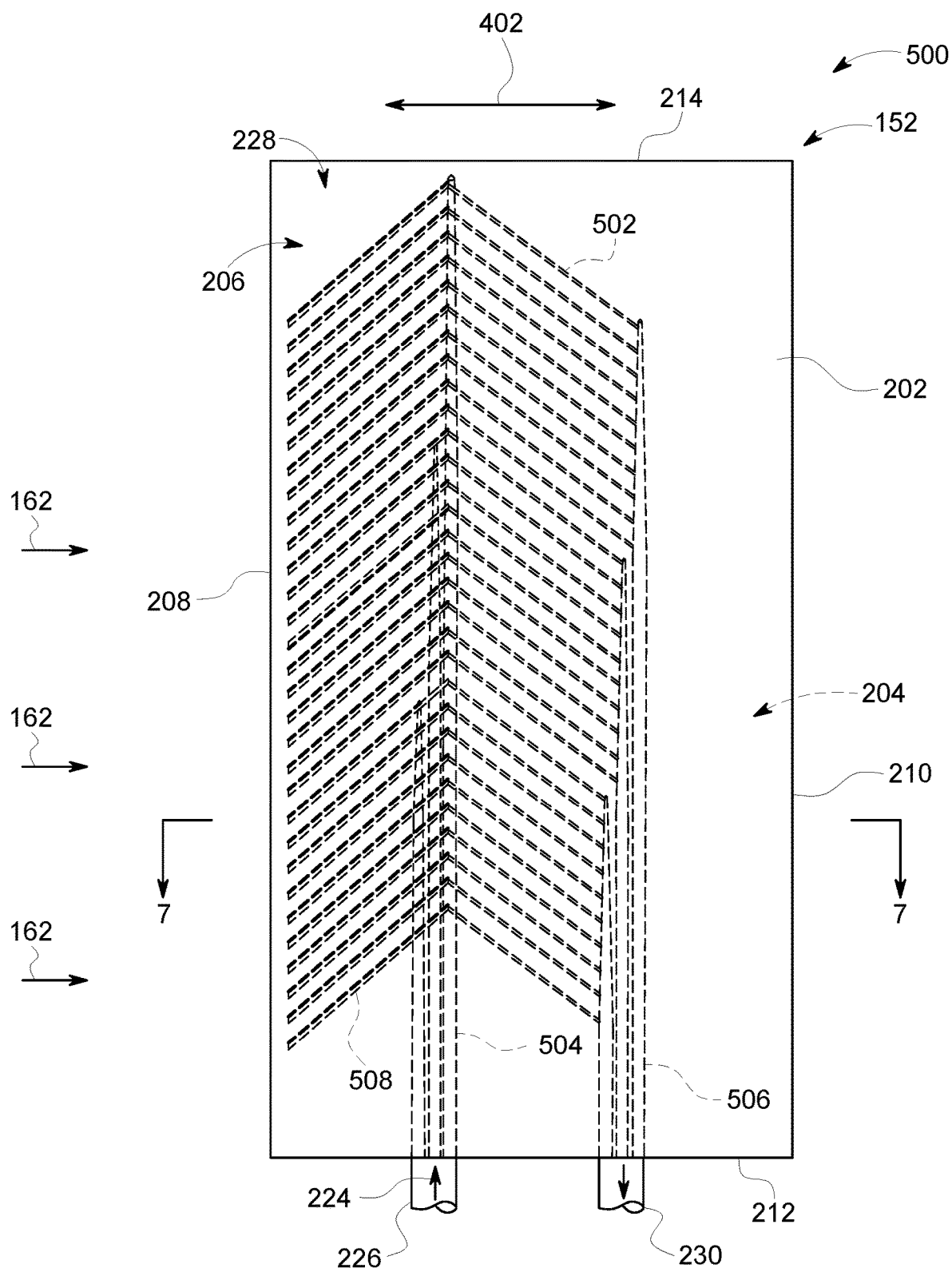
FIG. 6 is a side view of a further alternative heat exchanger that may be used with the turbofan engine shown in FIG. 1.
Figure 7:
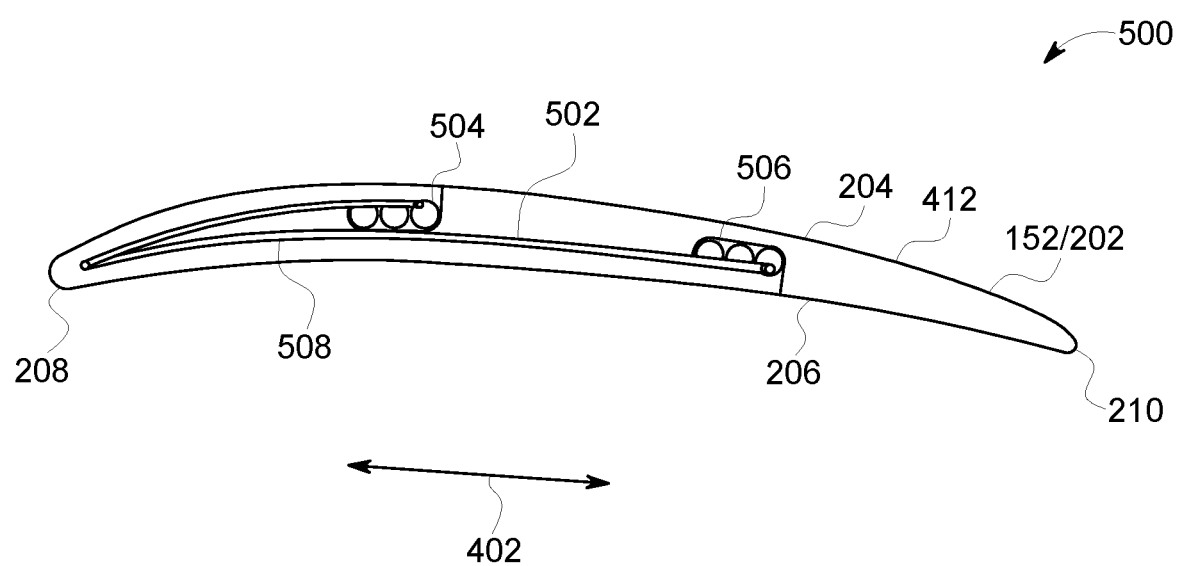
FIG. 7 is a cross-sectional view taken along 7-7 of the heat exchanger shown in FIG. 6.

FIG. 6 is a side view of another alternative heat exchanger 500 that may be used with turbofan engine 110 (shown in FIG. 1). FIG. 7 is a cross-sectional view taken along 7-7 of heat exchanger 500 shown in FIG. 6. Referring to FIGS. 6 and 7, in this embodiment, heat exchanger 500 is defined within outlet guide vane (OGV) 152. Similar to the embodiments described above, OGV 152 includes an airfoil 202 that includes suction sidewall 204, pressure sidewall 206, leading edge 208, trailing edge 210, root portion 212, and tip portion 214. Airfoil 202 further defines a chord direction 402.

In this embodiment, heat exchanger 500 includes at least one cooling channel 502 defined within airfoil 202 between pressure sidewall 206 and suction sidewall 204 and proximate leading edge 208. For example, cooling channels 502 include at least one inlet section 504 that extends from root portion 212 towards tip portion 214 adjacent suction sidewall 204 and at least one outlet section 506 that extends from tip portion 214 to root portion 212 adjacent pressure sidewall 206. Inlet sections 504 are positioned within airfoil 202 adjacent suction sidewall 204 and outlet sections 506 are positioned within airfoil 202 adjacent pressure sidewall 206.

Between inlet sections 504 and outlet sections 506, cooling channels 502 include at least one middle section 508 that extends along chord direction 402 from inlet sections 504 towards leading edge 208 adjacent suction sidewall 204 and from leading edge 208 to outlet sections 506 adjacent pressure sidewall 206 such that middle sections 508 correspond to perimeter 412 of airfoil 202. In this exemplary embodiment, middle sections 508 are not parallel to root and tip portions 212 and 214 of airfoil 202 and not orthogonal to leading edge 208. Middle sections 508 extend at a slope along chord direction 402. For example, along suction sidewall 204, middle sections 508 extend in a sloping direction from tip portion 214 towards root portion 212 and, along pressure sidewall 206, middle sections 508 extend in a sloping direction from root portion 212 towards tip portion 214 and then back down to root portion 212 in a V-shaped pattern. In alternative embodiments, middle sections 508 extend in any other sloping direction that enables heat exchanger 500 to operate as described herein. FIG. 6 illustrates a plurality of middle sections 508 defined within airfoil 202. However, in alternative embodiments, any other number of middle sections 508 are defined therein that enables heat exchanger 500 to operate as described herein.

Similar to the embodiments described above, cooling channels 502 are sized to facilitate maintaining a flow velocity of fluid that is channeled therethrough for consistent heat transfer, while also maintaining a predetermined wall thickness of airfoil 202. For example, inlet and outlet sections 504 and 506 each have three conical shaped sections that extend from root portion 212 towards tip portion 214 with a predetermined number of middle sections 410 having a similar cross-section flow area extending therebetween. As such, the flow velocity of fluid therethrough is constant throughout each section of cooling channel 502.

In operation, engine oil 224 is channeled to heat exchanger 500 and through cooling channels 502 by inlet line 226 for heat to be extracted therefrom. Specifically, fan air stream 162 impinges airfoil 202 at impingement zone 228. At impingement zone 228, heat is transferred from engine oil 224 channeled through cooling channels 502. Furthermore, as engine oil 224 is channeled through cooling channels 502 that are outside of impingement zone 228, heat is further removed by convection and conduction cooling through fan air stream 162 along pressure sidewall 206 and suction sidewall 204. The cooled engine oil 224 is then channeled back to the engine oil system through outlet line 230.

The above-described embodiments provide efficient heat exchangers defined within an airfoil for extracting heat from engine oil in a turbofan engine. Specifically, in the exemplary embodiments, a heat exchanger includes an outlet guide vane airfoil. The airfoil includes a pressure sidewall and a suction sidewall, which define a leading edge and a trailing edge. The leading edge defines an impingement zone of the airfoil in which a coolant stream impinges the airfoil. At least one cooling channel is defined within the airfoil and within the impingement zone proximate the leading edge. As such, when a fluid, for example, engine oil, is channeled through the cooling channels, the fluid is channeled through zones of the airfoil in which the coolant stream is at its most effective and with an increased heat transfer coefficient, thereby, increasing the efficiency of the heat exchanger and engine oil cooling system.

By defining the heat exchanger in the outlet guide vane, the engine oil cooling system does not create any additional aerodynamic drag within a bypass duct of the turbofan engine. Thereby, the heat exchanger increases the bypass ratio and the efficiency of the turbofan engine. Furthermore, the cooling stream includes fan bypass air which can accept a large amount of heat from the engine oil. By increasing efficiency of the airfoil heat exchanger, the amount of heat extracted from engine oil increases, and use of other engine oil cooling systems are reduced or even eliminated. Moreover, by defining the heat exchanger in an existing engine component, weight of the engine oil cooling system is decreased. Thereby, the heat exchanger decreases the weight of the engine oil cooling system and the overall turbofan engine weight, also, increasing efficiency of the turbofan engine.

An exemplary technical effect of the systems and methods described herein includes at least one of: (a) increasing efficiency of an air cooled oiler cooler heat exchanger; (b) increasing thermal control of engine oil in turbofan engines; (c) reducing drag of engine oil cooling systems positioned within a bypass duct and increasing bypass ratio of the turbofan engine; (d) reducing overall turbofan engine weight; and (e) increasing overall turbofan engine efficiency.

Exemplary embodiments of systems and methods for an air cooled oiler cooler heat exchanger are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the engine oil systems as described herein. Rather, the exemplary embodiments can be implemented and utilized in connection with many other turbofan engine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A heat exchanger comprising:
an airfoil configured to be positioned in a coolant stream, said airfoil comprising:
  a pressure sidewall; and
  a suction sidewall coupled to said pressure sidewall, said suction sidewall and said pressure sidewall define a leading edge, a trailing edge opposite said leading edge, a root portion, and a tip portion opposite said root portion, said leading edge defines an impingement zone wherein the coolant stream is configured to impinge said airfoil; and
at least one channel defined within said airfoil between said pressure sidewall and said suction sidewall, said at least one channel at least partially defined within the impingement zone proximate said leading edge, said at least one channel comprising:
  an inlet section extending from said root portion to adjacent said tip portion within said airfoil, said inlet section comprising a conical shape that tapers from said root portion towards said tip portion;
  an outlet section extending from adjacent said tip portion to said root portion, said outlet section comprising a conical shape that tapers from said root portion towards said tip portion; and
  at least one middle section defined within said airfoil and fluidly connecting said inlet section to said outlet section, wherein said at least one channel is configured to channel a fluid through said root portion into said inlet section and channel the fluid from said outlet section through said root portion, and wherein said at least one channel is configured to contain the fluid within said airfoil after the fluid enters into said inlet section until the fluid exits out of said outlet section.

2. The heat exchanger in accordance with claim 1, wherein said at least one channel is configured such that heat is removed from the fluid at least in part through the coolant stream impinging on said leading edge.

3. The heat exchanger in accordance with claim 1, wherein said leading edge and said trailing edge define a chord direction, and wherein said at least one middle section extends along the chord direction from said inlet section to said outlet section adjacent at least one of said pressure sidewall and said suction sidewall.

4. The heat exchanger in accordance with claim 3, wherein said inlet section is adjacent said suction sidewall.

5. The heat exchanger in accordance with claim 3, wherein said outlet section is adjacent said pressure sidewall.

6. The heat exchanger in accordance with claim 3, wherein said at least one middle section is substantially parallel to said tip portion and said root portion.

7. The heat exchanger in accordance with claim 3, wherein said at least one middle section extends at a slope along the chord direction.

8. The heat exchanger in accordance with claim 3, wherein said at least one middle section extends from said inlet section to said leading edge adjacent said suction sidewall and from said leading edge to said outlet section adjacent said pressure sidewall.

9. The heat exchanger in accordance with claim 1, wherein said at least one middle section comprises a plurality of discrete middle sections, each discrete middle section individually fluidly connecting said inlet section to said outlet section.

10. The heat exchanger in accordance with claim 6, wherein said at least one middle section comprises a plurality of discrete middle sections, each discrete middle section individually fluidly connecting said inlet section to said outlet section and each discrete middle section parallel to every other discrete middle section across an entire length of each discrete middle section from said inlet section to said outlet section.

11. The heat exchanger in accordance with claim 10, wherein each discrete middle section has a substantially similar cross-sectional area compared to every other discrete middle section.

12. An outlet guide vane comprising:
an airfoil configured to be positioned in a coolant stream, said airfoil comprising:
a pressure sidewall; and
a suction sidewall coupled to said pressure sidewall, said suction sidewall and said pressure sidewall define a leading edge, a trailing edge opposite said leading edge, a root portion, and a tip portion opposite said root portion, said leading edge defines an impingement zone wherein the coolant stream is configured to impinge said airfoil; and
a heat exchanger comprising at least one channel defined within said airfoil between said pressure sidewall and said suction sidewall, said at least one channel at least partially defined within the impingement zone proximate said leading edge, said at least one channel comprising:
an inlet section extending from said root portion to adjacent said tip portion within said airfoil, said inlet section comprising a conical shape that tapers from said root portion towards said tip portion;
an outlet section extending from adjacent said tip portion to said root portion, said outlet section comprising a conical shape that tapers from said root portion towards said tip portion; and
at least one middle section defined within said airfoil and fluidly connecting said inlet section to said outlet section, wherein said at least one channel is configured to channel a fluid through said root portion into said inlet section and channel the fluid from said outlet section through said root portion, and wherein said at least one channel is configured to contain the fluid within said airfoil after the fluid enters into said inlet section until the fluid exits out of said outlet section.

13. The outlet guide vane in accordance with claim 12, wherein said leading edge and said trailing edge define a chord direction, and wherein said at least one middle section extends along the chord direction from said inlet section to said outlet section adjacent at least one of said pressure sidewall and said suction sidewall.

14. The outlet guide vane in accordance with claim 12, wherein said at least one middle section comprises a plurality of discrete middle sections, each discrete middle section individually fluidly connecting said inlet section to said outlet section.

15. The outlet guide vane in accordance with claim 13, wherein said at least one middle section comprises a plurality of discrete middle sections, each discrete middle section individually fluidly connecting said inlet section to said outlet section and each discrete middle section parallel to every other discrete middle section across an entire length of each discrete middle section from said inlet section to said outlet section.

16. A turbofan engine comprising:
a core engine;
a bypass duct at least partially extending about said core engine; and
a plurality of circumferentially spaced outlet guide vanes extending between said core engine and said bypass duct, at least one outlet guide vane of said plurality of outlet guide vanes comprising:
an airfoil comprising:
a pressure sidewall; and
a suction sidewall coupled to said pressure sidewall, said suction sidewall and said pressure sidewall define a leading edge, a trailing edge opposite said leading edge, a root portion, and a tip portion opposite said root portion, said leading edge defines an impingement zone wherein a coolant stream is configured to impinge said airfoil; and
a heat exchanger comprising at least one channel defined within said airfoil between said pressure sidewall and said suction sidewall, said at least one channel at least partially defined within the impingement zone proximate said leading edge, said at least one channel comprising:
an inlet section extending from said root portion to adjacent said tip portion within said airfoil, said inlet section comprising a conical shape that tapers from said root portion towards said tip portion;
an outlet section extending from adjacent said tip portion to said root portion, said outlet section comprising a conical shape that tapers from said root portion towards said tip portion; and
at least one middle section defined within said airfoil and fluidly connecting said inlet section to said outlet section, wherein said at least one channel is configured to channel a fluid through said root portion into said inlet section and channel the fluid from said outlet section through said root portion, and wherein said at least one channel is configured to contain the fluid within said airfoil after the fluid enters into said inlet section until the fluid exits out of said outlet section.

17. The turbofan engine in accordance with claim 16, wherein said leading edge and said trailing edge define a chord direction, and wherein said at least one middle section extends along the chord direction from said inlet section to said outlet section adjacent at least one of said pressure sidewall and said suction sidewall.

18. The turbofan engine in accordance with claim 16, wherein said at least one middle section comprises a plurality of discrete middle sections, each discrete middle section individually fluidly connecting said inlet section to said outlet section.

19. The turbofan engine in accordance with claim 17, wherein said at least one middle section comprises a plurality of discrete middle sections, each discrete middle section individually fluidly connecting said inlet section to said outlet section and each discrete middle section parallel to every other discrete middle section across an entire length of each discrete middle section from said inlet section to said outlet section.

\* \* \* \* \*